United States Patent

Von Hornstein et al.

[15] 3,695,549

[45] Oct. 3, 1972

[54] TAPE TENSION CONTROL MEANS WITH SENSING LEVERS, PARTICULARLY FOR MAGNETIC SOUND RECORDERS

[72] Inventors: Wolf Freiherr Von Hornstein, Ottostrasse 4a, Starnberg; Hubert O. Richt, Buchenweg 4, Soecking; Albert Liebl, Am Muhleich 12, Starnberg, all of Germany

[22] Filed: April 7, 1970

[21] Appl. No.: 26,299

[52] U.S. Cl. ..................242/189, 242/75.5, 242/204

[51] Int. Cl.....B65h 25/04, B65h 25/22, G11b 15/46

[58] Field of Search.....242/186, 189, 200, 204, 75.4, 242/75.5

[56] References Cited

UNITED STATES PATENTS

| | | | |
|---|---|---|---|
| 2,745,604 | 5/1956 | Masterson | 242/75.5 X |
| 3,448,940 | 6/1969 | Atsumi | 242/204 |
| 3,085,759 | 4/1963 | Guest | 242/204 |
| 3,394,962 | 3/1968 | Dunsheath | 242/189 |
| 2,855,160 | 10/1958 | Fundingslaxid | 242/189 X |
| 3,390,841 | 7/1968 | Maxey | 242/189 |
| 3,469,800 | 9/1969 | Ayukowa | 242/204 X |
| 3,606,200 | 9/1971 | Richt | 242/189 |

*Primary Examiner*—George F. Mautz
*Assistant Examiner*—Edward J. McCarthy
*Attorney*—Stevens, Davis, Miller & Mosher

[57] ABSTRACT

A drive for a tape recorder by means of which a recording tape can be fed from a storage reel to a take-up reel or vice versa at different speeds corresponding to the operating functions 'normal operation', 'rapid wind' and 'rapid re-wind.' The tape runs over two tension sensers associated with the storage and take-up reels. The sensers set the tension in the tape to different values for the different operating functions, the tension being changed by springs associated with the sensers. The movement of the sensers is transmitted to variable friction clutches associated with the take-up and storage plates.

10 Claims, 6 Drawing Figures

TAPE TENSION CONTROL MEANS WITH SENSING LEVERS, PARTICULARLY FOR MAGNETIC SOUND RECORDERS

Our invention relates to a drive for tape recorders equipped with a so-called tension control. More particularly, the invention relates to a drive in which the tension in the tape existing between a take-up reel and a capstan driving the tape at a constant speed as well as between a storage reel and said capstan is sensed and set to a certain value by respective tension sensers.

Drives for tape recorders are known, in which a disc carrying the take-up reel and a disc carrying the storage reel is lifted from a friction lining when sudden shock loads act on the tape. To achieve this, the section of tape between the capstan and storage reel is led as a loop about one tension senser and the tape is similarly led as a loop about a second tension senser along a section between the take-up reel and the capstan. If a shock load is now exerted on the tape by sudden stopping, the length of loop is reduced and it displaces the tension senser. Such displacement of the tension senser is then transmitted through a lever or cable system containing a damping element to a rod disposed in the rotary axis of the take-up or storage reel, said rod moving upwardly and lifting the take-up disc from the friction lining. The driving force acting on the take-up reel is in this way reduced. However, yielding of the tension senser and reduction of the transmitted driving force prevents the tape from being strained or otherwise damaged if the passage thereof is suddenly stopped.

It is also known to use magnetic clutches instead of friction clutches; the magnetic clutches permit a variation in the transmitted torque by reducing or increasing the air gap bridged by the magnetic flux. In such arrangements the change in magnetic flux likewise takes place in dependence on tension sensers for the tape. However, the two tension sensers associated with the take-up and storage reels are intercoupled so that the torque transmitted to the take-up reel is increased to the same extent as the torque transmitted to the storage reel is decreased, or vice versa. In these arrangements the take-up and storage reels are driven in opposite directions. Such oppositely directed drive has the disadvantage that vibrations and rapid minor variations in the speed of the motor are transmitted to the tape by the storage reel as well as by the take-up reel. The tension control of the tape and regulation of the transmitted torque cannot, however, follow these fluctuations sufficiently rapidly. Tone (audio) oscillation is therefore produced during recording or playback. In extreme cases, for example if the tape recorder is moved to and fro during operation, this condition could make itself felt in ' whining noises.' In conventional recorders, that is to say those without tension control, the drive portion for the storage reel is held fast by braking or latching during recording and playback. This not only prevents sudden minor speed variations of the motor from being transmitted to the storage reel but damping is also effected of speed variations reaching the tape from the motor through the take-up reel. Since the storage reel runs at constant friction relatively to a stationary portion, the unwinding and thus the passage of the tape are not substantially changed even if the tension exerted on the tape by the take-up reel fluctuates somewhat momentarily. Recorders of this kind have not yet been provided with tension control. For the smooth running of the tape recorder, it is however of considerable importance if more prolonged changes in tension, i.e. those lasting longer than one-tenth second, are so regulated that uniform tension will always be exerted on the tape.

It is an object of the invention to provide a drive for a tape recorder with tension control so that a more uniform feed of the tape is obtained than hitherto; in particular, short term variations as well as more prolonged changes in the tension transmitted to the tape are to be compensated by means of the invention.

It is a further object of the invention to construct the tension control of the drive so that it is effective not only during normal operation of the tape recorder, i.e. during recording and playback, but also during respooling so that a uniformly tight coil of tape is formed. This does not merely safeguard the tape. Unwinding of a uniformly tightly wound recording tape is also more favorable for the tape recorder from the point of view of uniform running properties than in the case of a coil that was wound more tightly at some times than at others. This is also intended to prevent the creation of parts in the coil which were so loosely wound that the tape slips through during unwinding, which would be particularly detrimental to uniform running or synchronism.

It is yet another object of the invention to provide a drive that permits the desired tape tension to be set on the take-up or winding side as well as on the storage or unwinding side by regulating the force of appropriate springs.

It is a still further object of the invention to provide only a single rigid transmission member for transmitting the motion of each lever associated with the tension sensers to corresponding friction clutches. This prevents the tension in the tape from departing from the desired given values as a result of changes in the transmitting paths.

Other objects of the invention will become evident from the following specific description with reference to the drawings.

A preferred embodiment of a tape recorder according to the invention is illustrated in the drawings, in which FIG. 1 is a perspective view of the tape recorder from the top;

Figure 1:
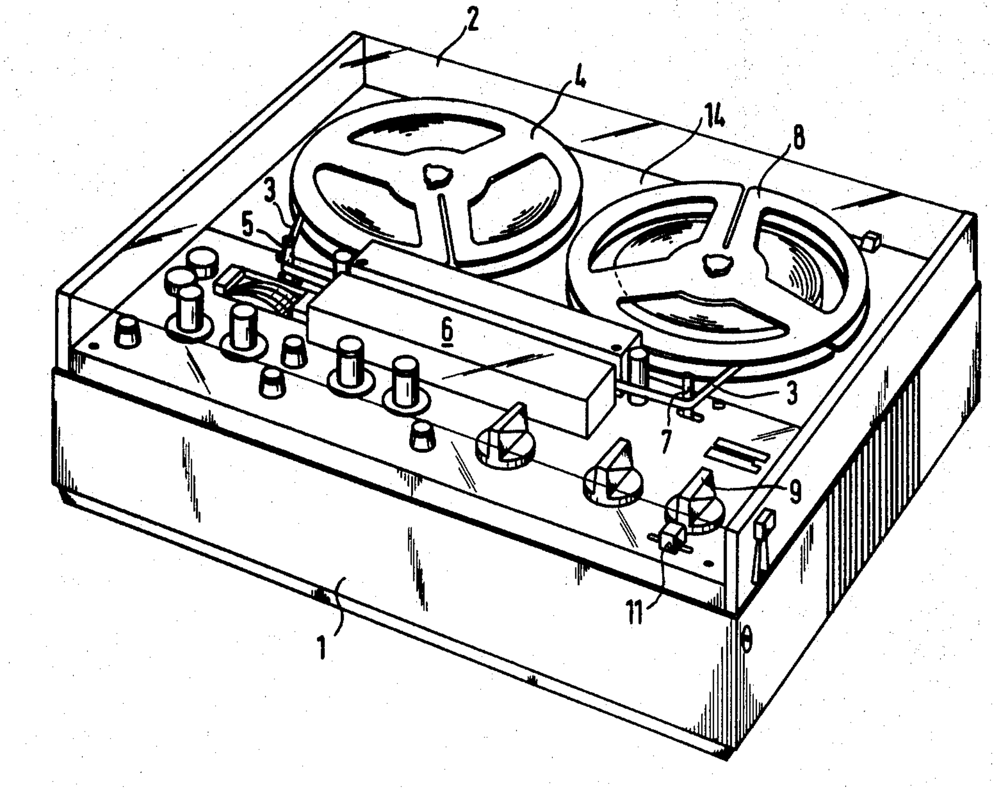

Referring to FIG. 1, it will be evident that the tape recorder according to the invention comprises a housing 1 which can be closed by a cover 2 such as of transparent plastics material. A recording tape 3 runs from a storage reel 4 about a first tension senser 5, through feed and scanning equipment 6, about a second tension senser 7 and to a take-up reel 8. The feed and scanning equipment 6 contains one or more of the well known magnetic heads or other recording or scanning means and constant drive means which feed the magnetic recording tape from the storage reel 4 to the take-up reel 8 at a speed which is as uniform as possible.

Provision is also made for a series of operating buttons and indicating instruments which are conventional for tape recorders. Since the invention is concerned with the drive for the tape and such equipment will be well known to a man skilled in the art, more detailed explanations will be dispensed with. The same applied to the electrical equipment which receives the sound, converts it to electrical oscillations, effects recording on the tape and scans the recorded oscillations and reconverts them to audio-oscillations.

An actuating knob 9 is of interest by means of which the drive components can be brought to the operating function 'record ' and ' playback' and a sliding button 11 by which the drive components can be brought to the functions 'rapid wind ' and 'rapid rewind' , in a manner that will now be explained with reference to the other figures.

Figure 2:
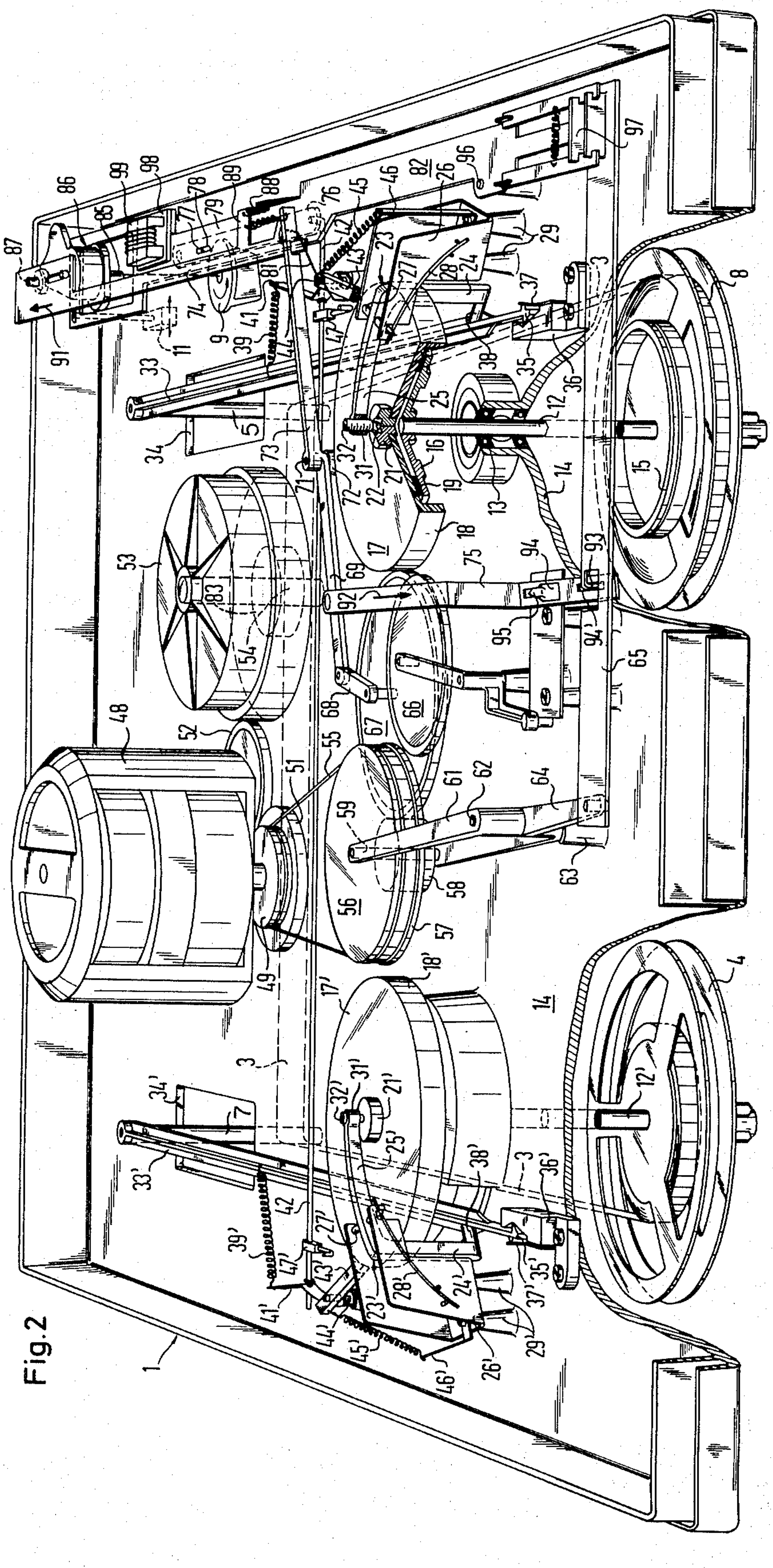
FIG. 2 is a pictorial view taken from the bottom and rear.

With reference to FIG. 2, it may be mentioned that the mounting of the drive and the associated tension control equipment for the storage reel 4 is the same as for the take-up reel 8. It will therefore suffice to describe the equipment for one of the reels.

A shaft 12 or 12′ is mounted for rotation in a ball bearing 13 but against displacement in a longitudinal direction. The ball bearing 13 is fixed to a plate 14 of the housing 1. The shaft 12 carries a disc 15 on which the take-up reel 8 can be placed. The arrangement is similar for the storage reel 4 but the disc has in this case been omitted for clarity. Fixed to the lower end of the shaft 12 there is a disc 16 which forms one part of a friction clutch. The active portion of the friction clutch is formed by a disc 17 or 17′ which is made of a suitable material and the rim 18 or 18′ of which is so formed that suitable drive and brake means can engage therewith as hereinafter described. Between the disc 16 and the base of the disc 17 or 17′ there is a friction lining 19 which may be of felt and which is most suitably attached to the disc 16 such as by being glued thereto. The base of the plate 17 or 17′ carries a metallic sleeve 21 or 21′ containing a cavity which is concentric with the rotary axis and accommodates a ball 22. Provision is made further for an angular lever 23 or 23′ comprising an arm 24 or 24′ extending substantially parallel to the shaft 12 or 12′ and an arm 25 or 25′ perpendicular thereto. The lever 23 is pivotally mounted on a shaft 27 or 27′ of a bracket 26 or 26′ . The shaft 27 or 27′ is held in an associated lug of the bracket 26 or 26′ by a leaf spring 28 or 28′ . The brackets 26 or 26′ are secured to appropriate moulded-on projections 29 or 29′ of the plate 14.

At its end, the arm 25 or 25′ of the angular lever 23, 23′ is provided with an eye 31 or 31′ which is internally screw-threaded. The internal screwthread of the eye 31 or 31′ receives a grub screw 32 or 32′ , the upper end of which lies against the ball 22. By swinging the angular lever 23 in a counter-clockwise direction, the disc 17 or 17′ is pressed upwardly via the ball 22 and metallic sleeve 21 whereby the friction of the parts 16, 17 and 19 constituting the friction clutch is increased. Upon movement in the opposite direction, the friction and the corresponding transmitted torque are reduced.

The first tension senser 5 and the second tension senser 7 are each fixed to an associated sensing lever 33 or 33′; they project upwardly from the lever and extend through respective recesses 34 or 34′ in the upper plate 14 of the housing. At the end remote from the senser 5 or senser 7, the sensing levers 33 or 33′ each carry a knife edge 35 or 35′ engaging in a knife edge bearing 36 or 36′. The knife edge bearings 36 or 36′ are fixed to the upper plate 14 of the housing 1. A leaf spring 37 or 37′ associated with each holds the knife edge 35 or 35′ in engagement with the knife edge bearing 36 or 36′.

At its free end the arm 24 or 24′ of the angular lever 23, 23′ carries a pin 38 or 38′ which lies on the sensing lever 33 or 33′ . If the tension sensers 5 or 7 move outwardly, that is to say away from one another and away from the feed and scanning equipment 6, the torque transmitted by the friction clutch 16, 17 and 19 or 16′, 17′ and 19′ becomes larger; the torque is reduced upon movement in the opposite direction.

The sensing levers 33 and 33′ are connected to one end of an associated coil spring 39 or 39′; the other ends of the spring 39 and 39′ are fixed to a vane 41 or 41′. The vanes 41 or 41′ are seated on a rod 42 which is displaceable transversely to the rotary axis of the shafts 12 and 12′ .

Brake shoes 43 or 43′ are rotatably mounted on pins 44 or 44′. A spring 45 or 45′ pushes the front end of the associated brake shoe 43 or 43′ against the rim 18 or 18′ of the disc 17 or 17′ . The springs 45 or 45′ are secured to the vanes 46 or 46′ which, together with the bracket 26 or 26′, are screwed to the moulded-on projections 29 or 29′. Secured to the rod 42 there are hook-shaped elements 47 or 47′ which, upon longitudinal displacement of the rod 42, ensure that one or the other brake shoe 43 or 43′ is swung against the action of the associated spring 45 or 45′ and thereby lifted from the rim 18 or 18′ of the disc 17 or 17′ .

A motor 48, of which the housing is secured to the upper plate 14 of the housing 1 by means which are not illustrated, drives a pulley 49 and a friction wheel 51; the latter is provided in well known manner with several steps of different diameter but these steps are omitted for clarity. An intermediate wheel 52 can be brought into abutment with one of the steps of the friction wheel 51 and will then drive a flywheel 53 which is fixed to a capstan 54 for feeding the recording tape. A drive belt 55 about the pulley 49 turns a further pulley 56 having a friction lining 57 at its periphery. The pulley 56 together with a take-up friction wheel 58 fixed thereto is secured to a shaft 59 rotatably mounted in a bifurcated lever 61. The lever 61 is rotatably secured to a moulded-on projection 63 of the plate 14 by means of a pivot pin 62. One arm 64 of the lever 61 engages in a slide 65. If, for the purpose of rapidly rewinding the recording tape in one or the other direction, the slide 65 is displaced lengthwise then, during pivoting of the lever 61 in a clockwise direction, the friction lining 57 comes to lie against an intermediate wheel 66 which acts on the rim 18 of the disc 17 and thereby sets the take-up reel 8 into rapid rotation. On pivoting the lever 61 in a counter-clockwise direction, the friction lining 57 comes into contact with the rim 18' of the dics 17' so that the storage reel 4 is set into rapid rotation.

An intermediate wheel 67 for the take-up operation at normal speed is connected by a guide member 68 to a lever 69 which is pivotable about a pin 71 screwed into a further moulded-on projection 72 of the upper plate 14 of the housing. The lever 69 has an integral arm 73 which engages a rod 74 associated with the actuating knob 9. When the lever 69 is swung clockwise then the intermediate wheel 67 engages the take-up drive wheel 58 which has a smaller diameter and the rim 18 of the disc 17. The guide member 68 makes it possible for the intermediate wheel 67 to swing against the take-up drive wheel 58 and the rim 18. By reason of the smaller diameter of the take-up drive wheel 58 relatively to the friction lining 57 and the larger diameter of the intermediate wheel 67 in relation to the intermediate wheel 66 it is ensured that the disc 17 will be driven at a much slower speed than during the re-spooling effected by the intermediate wheel 66. In other words, a speed is obtained for normal operation as required for recording and playback. A connecting rod 75 hinged to the lever 69 ensures that both operations are blocked from one another; only one of the intermediate wheels 66 and 67 can thus be in engagement with the associated drive elements at any one time.

During the normal operation for recording and playback the rod 42 is in a medial position at which the springs 39 and 39' are equally tensioned. The first tension senser 5 and the second tension senser 7 are thus pulled apart by the springs 39 or 39' to tension the recording tape 3 between each other. When the tension in the tape in the section between the storage reel 4 and the capstan 54 subsides then the sensing lever 33' swings counter-clockwise whereby, as hereinbefore described, the arm 25' of the angular lever 23' presses the disc 17' upwardly and thereby increases the friction. In this way the tape is made taut. Uniform tension is ensured at all times by reason of the force of the coil spring 39. The same effect is obtained by the tension senser 5 on the section of the tape 3 located between the capstan 54 and the take-up reel 8.

The rod 42 is fixed to a lever 76 which engages by means of a pin 77 in a slot 78 of a re-spooling lever 79 associated with the slide button 11. In this way an amplifier is produced which ensures that the displacement of the slide button 11 in the one or other direction will result in much greater displacement of the rod 42.

Figure 3:
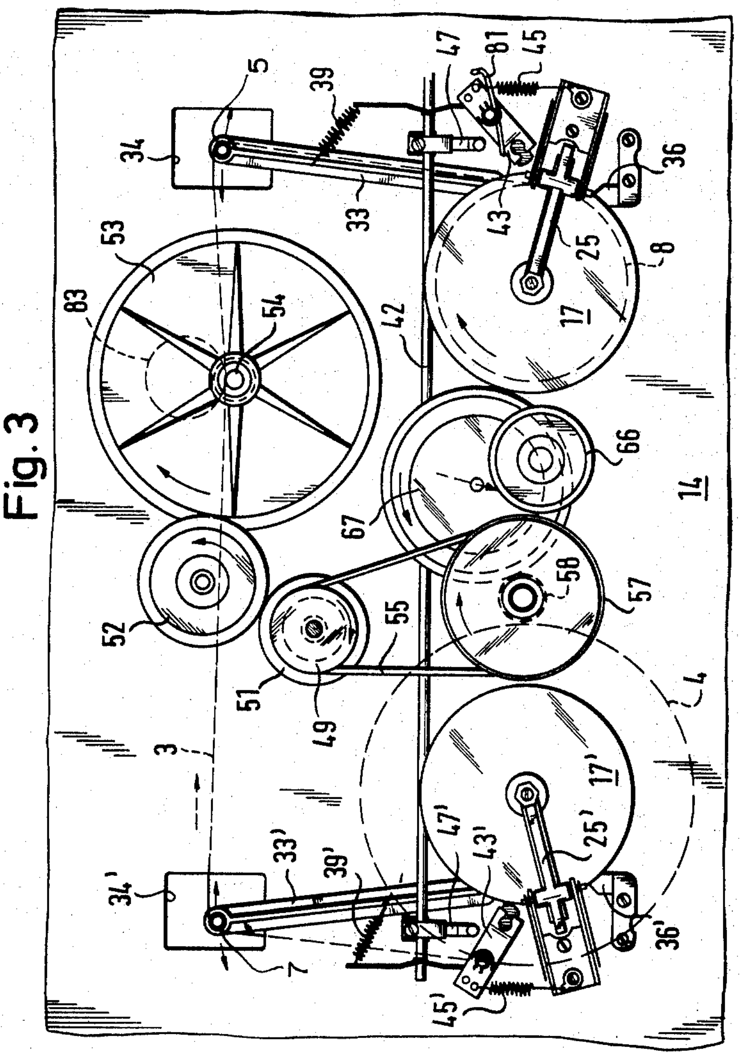
FIG. 3 is a diagrammatic representation of the important parts of the drive mechanism, likewise viewed from underneath and the rear, the housing and other components having been omitted and the drive means being disposed in a position for recording or playback.

In FIG. 3 the operative positions of the important parts are illustrated for the operating function 'normal wind', i.e. recording or playback. The disc 17 is driven by the motor 48 through the intermediate wheel 67, the take-up drive wheel 58, the belt 55 and the pulley 49. The rod 42 is disposed in a medial position because the slide button 11 is likewise located in a medial position. The brake shoe 43 is lifted off by an actuating wire 81 which is coupled to the rod 74. The brake shoe 43' was, however, released by the associated hook-shaped element 47' so that it is pressed by the associated spring 45' against the rim 18' of the disc 17'. The tape 3 passing about the tension sensers 5 and 7 is driven at a constant speed by the capstan 54 against which a pressure roll 83 is pressed, because the associated flywheel 53 is driven by the intermediate wheel 52 which is in engagement with the friction wheel 51. The rotary motion of the disc 17 is now transmitted with appropriate slip through the friction lining 19 onto the disc 16 and from there to the take-up reel 8. The tension senser 5 effects control of the slip between the two parts so that a precisely predetermined tension exists in the tape 3. Since the disc 17' associated with the storage reel 4 is held by the brake 43', there is likewise relative motion between the disc 17' and the disc 16' whereby the latter is carried along by the unwinding of the tape 3. The tension senser 7 likewise ensures that a given tension is maintained in the tape, namely the same tension as on the take-up side. Since the tensile forces act in different directions, the capstan 54 need not overcome any force in order to feed the tape. This ensures smooth running or synchronism and therefore a good quality of reproduction for the tape recorder.

Figure 4:
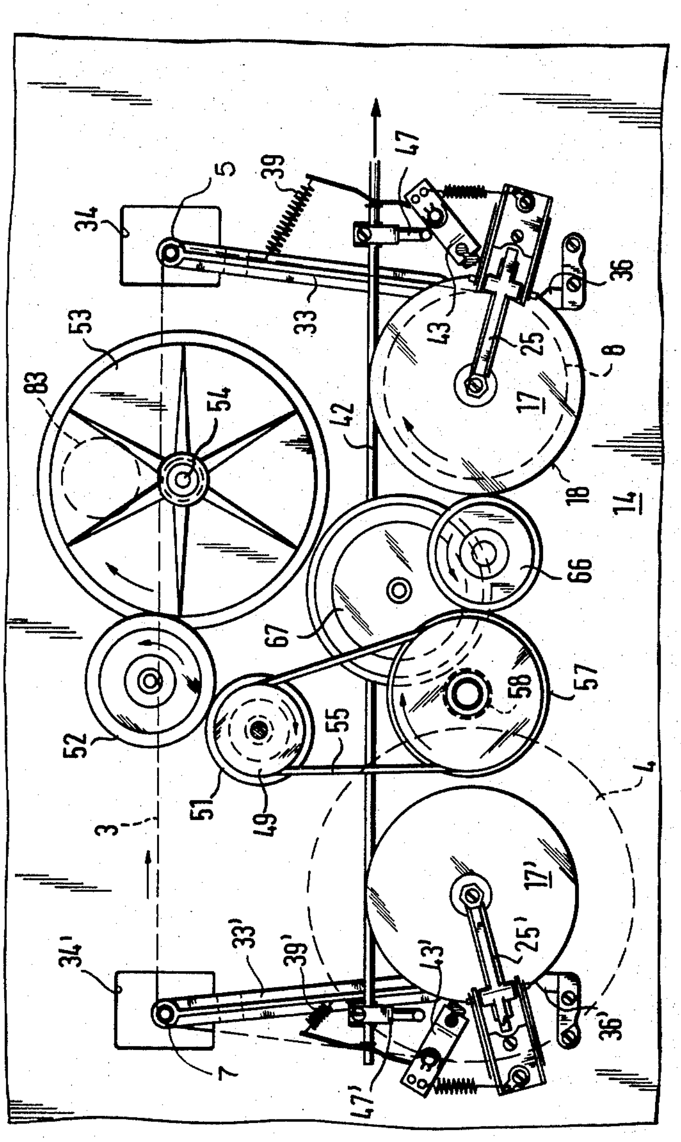
FIG. 4 is a view similar to FIG. 3, the drive means being in the 'rapid wind' condition.

FIG. 4 illustrates the rapid winding condition. The intermediate wheel 67 was brought out of engagement with the rim 18 of the disc 17 or with the take-up drive wheel 58; for this purpose the intermediate wheel 66 was swung inwardly so that it is located in contact with the friction lining 57 and the rim 18 of the disc 17. The rod 42 was then displaced to the right so that the coil spring 39 is placed under greater tension while the tension of the coil spring 39' has been relaxed. The pressure roll 83 is lifted off the recording tape. By reason of the stronger tension of the spring 39, the friction clutch formed by the elements 16, 17 and 19 transmits a considerably higher torque, i.e. the relative slip between the disc 16 and 17 is now much smaller than during normal operation as described with reference to FIG. 3. This means that the take-up reel 8 is driven at a high speed approaching that of the disc 17. On the other side, relaxing of the tension in the spring 39' has reduced the friction between the disc 16' and the disc 17'. The tape is therefore unwound from the storage reel 4 at a lower tension which is nevertheless controlled and uniform. Instead of the actuating wire 81, the hook-shaped element 47 effects lifting of the brake shoe 43.

Figure 5:
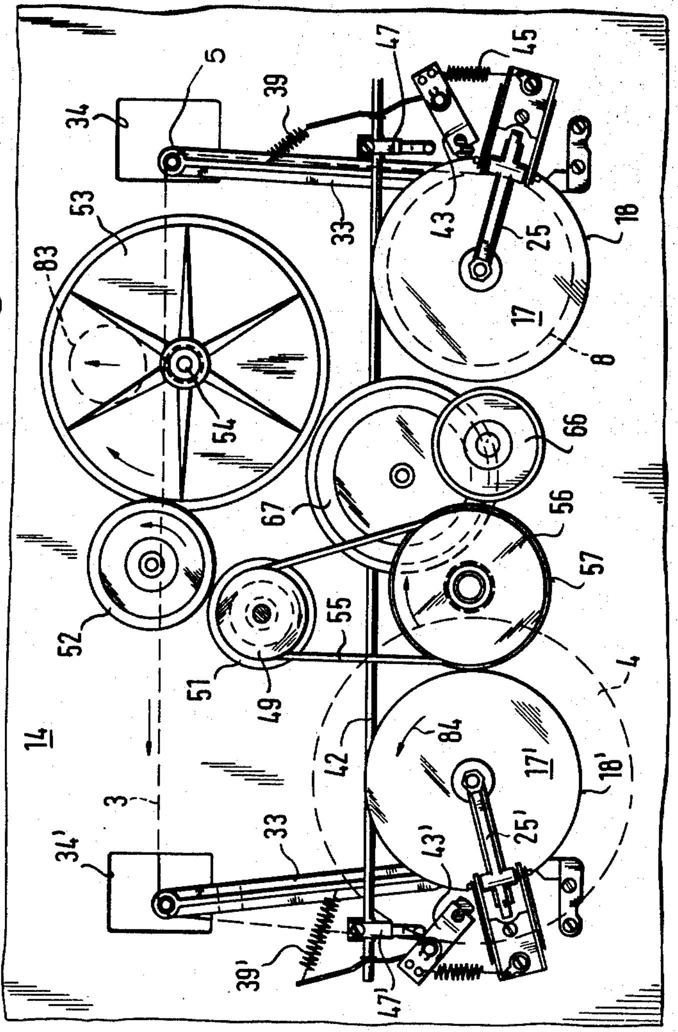
FIG. 5 is a view similar to those of FIGS. 3 and 4, the drive means being in a 'rapid rewind' position.

FIG. 5 shows the position of the drive means during the 'rapid rewind' function. The pressure roll 83 is again in a position swung away from the capstan 54 so that the tape 3 can pass through without hindrance. The pulley 56 is swung to the left so that the friction lining 57 lies against the disc 17' associated with the storage reel 4. The disc 17' is therefore turned at a high speed opposite to its usual direction of rotation as shown by the arrow 84. The rod 42 is, in contrast with the medial position of FIG. 3, displaced to the left so that the spring 39' exerts a stronger force while the spring 39 is weaker. The hook-shaped element 47' adjustably fixed to the rod 42 has swung the brake shoe 43' away from the rim 18' of the disc 17'. The brake shoe 43 associated with the take-up reel 8 has, however, been released by the hook-shaped element 47 and therefore pressed against the rim 18 of the disc 17 under the action of the spring 45. By reason of the higher force of the spring 39', a large proportion of the torque is transmitted to the storage reel 4 whereas there is corresponding relative rotation between the disc 17 that is being braked and the take-up reel 8 which is turning at a high speed under the tension in the tape. The friction lining 19 acts as a brake which remains set at a predetermined value through the spring 39 and the tension senser 5. This means that during rewinding the coil of tape will be spooled with uniform tightness. No larger tensile loads that might stretch or otherwise damage the recording tape are setup during re-spooling. Moreover, this applies in regard to FIG. 4 by the rapid winding operation.

Figure 6:
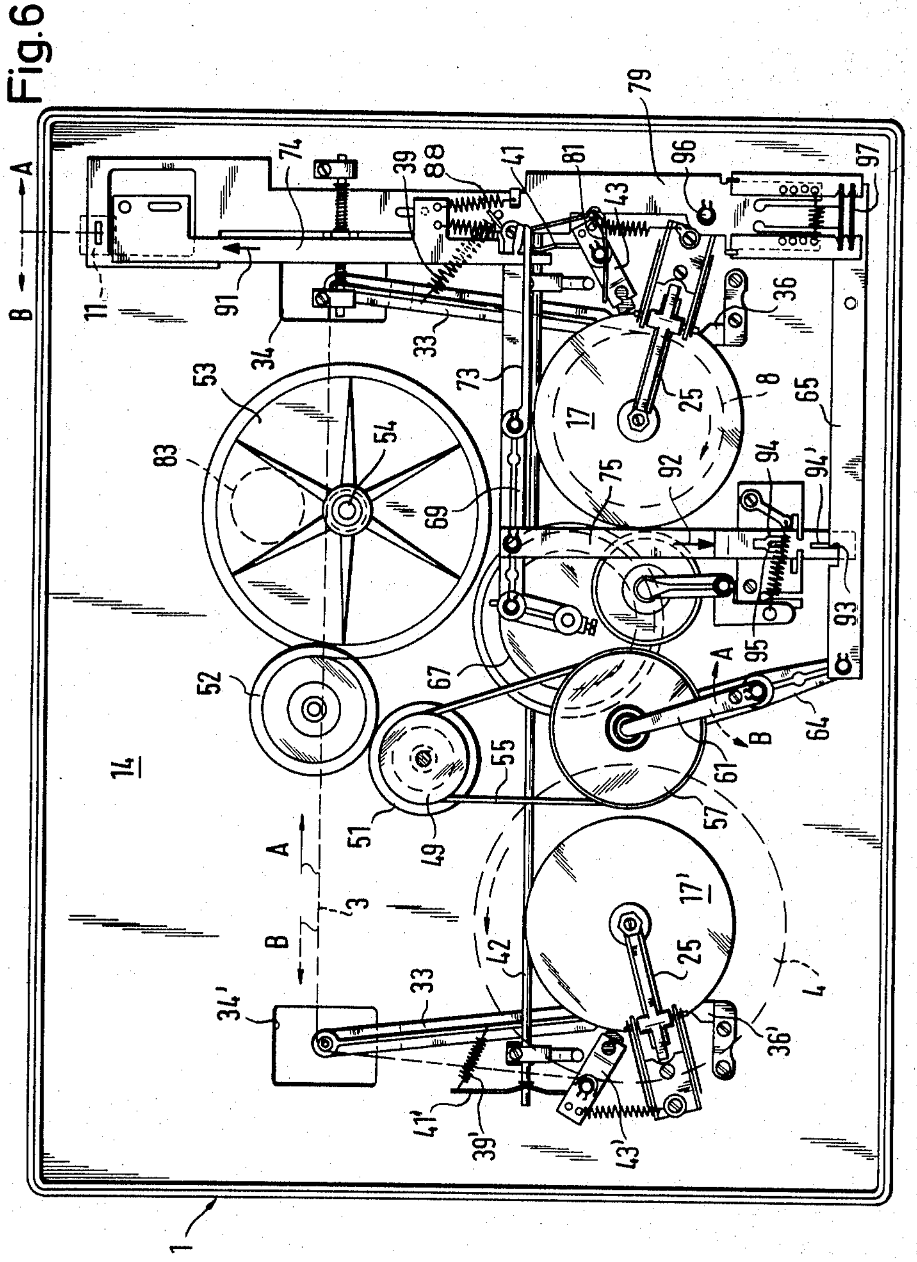
FIG. 6 is a view of the drive and actuating means taken from below and the rear, showing how the drive means are brought to their 'rapid wind and rapid rewind' positions.

FIG. 6 explains the co-operation of the lever systems when changing to the various operating functions. The actuating knob 9 (FIG. 1) is fixed to a shaft 85 which is firmly connected to a cam arrangement 86 (FIG. 2). A pin or roller 87 fixed to the rod 74 scans the cam surface. The pressure is exerted by a spring 88 which is suspended in an extension 89 of the rod 74. When the actuating knob 9 is turned to its operative position then the rod 74 is withdrawn in the direction of the arrow 91, the lever 69 being swung by its arm 73 in a counterclockwise direction. As already described, the intermediate wheel 67 is swung in so that the take-up wheel 8 is driven at normal speed. The connecting rod 75 is displaced in the direction of the arrow 92, a lug 93 bent out of the slide 65 engaging in a slot 94' of the connecting rod 75 so that reciprocation of the slide 65 carries the connecting rod 75 along with it. A stationary pin 95 connected to the upper plate 14 engages in a recess 94 of the connecting rod 75. The recess 94 is so shaped that the pin 95 will not obstruct pivotal motion of the connecting rod 75 when the latter is in its withdrawn position. However, pivotal motion is blocked if the connecting rod 75 has been displaced in the direction of the arrow 92. This means that during the normal operations 'record' or 'playback' the re-spooling functions cannot be set into operation. Conversely, during re-spooling the actuating knob 9 cannot be brought into a position for 'record' or 'playback.' This is because during re-spooling the slide 65 is in a position swung to the left or right relatively to the FIG. 6 position. Since the connecting rod 75 was carried along during this swinging motion, the pin 95 blocks displacement of the connecting rod 75 in the direction of the arrow 92 by lying against the left or right-hand step in the recess 94.

To actuate the re-spooling function in one or the other direction, the slide button 11 is pushed in the direction of the arrow A whereupon the tape 3 will be rapidly wound on the take-up reel 8 in the direction of the arrow A. If the slide button is moved in the direction of the broken arrow B, then the tape will be rapidly re-wound on the storage reel 4 in the direction of the arrow B. During this actuation of the slide button 11 the pivotal lever 79 is swung about the shaft 96. Since the lever 65 is resiliently clamped in that end of the pivotal lever 79 which is remote from the slide button 11, there will be a corresponding displacement of the slide 65 in the one or other direction, the lever 61 then likewise being swung in the direction of the arrow A or B whereby the previously described drive for the re-spooling functions will come into operation.

Actuation of the slide button 11 takes place against the action of two springs (not shown). Fixing in the desired positions is effected by means of an electromagnet 99 which acts on a plate-shaped extension 98 of the lever 79. The electromagnet 99 is de-energized by means of a locating contact (not shown) if it is slightly tilted.

We claim:

1. Apparatus for controlling tension of a tape particularly for use in magnetic tape recording apparatus, comprising, in combination: a tape supply reel; a take-up reel; a tape path between said supply and take-up reels; constant drive means for maintaining a constant drive force on said tape in a first mode of operation of feeding said tape between said supply and take-up reels; first tension sensing means disposed in said tape path between said supply reel and said constant drive means; second tension sensing means disposed in the path of said tape between said constant drive means and said take-up reel; said tape being trained at least partially around said first and second tension sensing means; first and second friction clutch means connected to said supply and take-up reels, respectively, each of said friction clutch means including a clutch disc rigidly mounted for rotation with a respective one of said reels and a driving disc mounted for engagement with said clutch disc; first drive means engaging the friction clutch means of said take-up reel in said first mode of operation for driving said take-up reel at a first speed; second drive means engaging said friction clutch means of said take-up reel in a second mode of operation for driving said take-up reel at a second speed which is higher than said first speed; third drive means engaging the friction clutch means of said supply reel in a third mode of operation for driving said supply reel at said second speed; first and second brake means engaging at least one of said driving discs for braking the rotation of at least one of said supply and take-up reels dependent upon the mode of operation of said apparatus; first and second rocking levers, said first and second tension sensing means being mounted on said first and second rocking levers, respectively; first and second biasing means connected to said first and second rocking levers, respectively, and normally biasing said rocking levers in a first direction for maintaining an initial tension on said tape during said first mode of operation; coupling means for concurrently adjusting the biasing force exerted by said first and second biasing means on said first and second rocking levers, respectively; operation changing means for changing the mode of operation of said apparatus among said first, second and third modes of operation, said coupling means being connected to said changing means; and connecting means connecting said first and second rocking levers to said first and second friction clutch means, respectively, for changing the tension imparted to said tape by said reels as a function of the amount of tension on said tape sensed by said tension sensing means.

2. The apparatus according to claim 1, wherein said coupling means comprises an axially movable rod, and first and second adjustable members mounted on said rod; and said biasing means each comprises a spring having one end connected to one of said rocking levers and the opposite end connected to a respective one of said first and second adjustable members.

3. The apparatus according to claim 1, wherein said rocking levers are mounted for pivotal movement; and said connecting means comprises first and second rigid members engaging said first and second rocking levers and said first and second friction clutch means, respectively, and means mounting said rigid members for pivotal movement about a fixed axis.

4. The apparatus according to claim 3, wherein said rigid members further comprise an angularly shaped lever having one arm in contact with an associated one of said rocking levers and a second arm in contact with the driving disc of an associated one of said friction clutch means.

5. The apparatus according to claim 3, further comprising first means connected to said operation changing means for disengaging said first brake means from the driving disc engaging said take-up reel and second means connected to said operation changing means for engaging said first drive means and said take-up reel.

6. The apparatus according to claim 5, further comprising second operation changing means having first and second positions; third means connected to said second operation changing means for disengaging said first brake means from said driving disc engaging said take-up reel and engaging said second brake means with the driving disc engaging said supply reel in said first position; fourth means connected to said second operation changing means for engaging said second drive means with said take-up reel in said second position; said third means disengaging said second brake means from said supply reel and engaging said first brake means with said take-up reel in said second position; and fifth means connected to said second operation changing means for engaging said third drive means with said supply reel in said second position.

7. The apparatus according to claim 6, further comprising an axially movable rod; and wherein said third means comprises first and second adjustable members mounted on said rod for engagement with said first and second brake means, respectively.

8. The apparatus according to claim 6, further comprising stop means connecting said operation changing means and said second operation changing means to each other wherein the operability of one operation changing means is dependent upon the operating position of the other operation changing means.

9. The apparatus according to claim 1, wherein said first drive means comprises a friction wheel, a motor, a driving wheel connected to said motor, and means mounting said friction wheel for rotating engagement with said driving wheel and the driving disc of said second friction clutch means.

10. The apparatus according to claim 1, wherein said third drive means comprises a motor, a driving wheel connected to said motor, and driving wheel mounting means pivotally mounting said driving wheel, wherein in a first position of said driving wheel mounting means, said driving wheel engages the driving disc of said first friction clutch means; and wherein said second drive means comprises an intermediate drive wheel and means mounting said intermediate drive wheel for engagement with said driving wheel and the driving disc of said second friction clutch means in a second position of said driving wheel mounting means.

* * * * *